United States Patent Office 2,894,939
Patented July 14, 1959

2,894,939

PROCESS FOR UPGRADING POLYMERIZED FATTY ACID MIXTURES

Burt L. Hampton, Port St. Joe, Fla., assignor to The Glidden Company, Cleveland, Ohio, a corporation of Ohio No Drawing. Application September 23, 1957
Serial No. 685,376

14 Claims. (Cl. 260—97.7)

This invention provides a process for upgrading polymerized fatty acids mixtures. The invention is more specifically directed to an improved and novel process for refining a mixture comprising fatty acid polymers to thereby obtain a product of improved quality and color.

In my copending application, Serial No. 685,377, filed even date herewith, I have disclosed a process for preparing fatty acid polymers by polymerizing an unsaturated fatty acid material with a catalyst comprising a zinc halide or oxide in the presence of a halogen or hydrogen halide. In a preferred application of the invention disclosed in said copending case, a tall oil fatty acid mixture is heated with catalytic quantities of zinc chloride in the presence of an excess of free hydrogen chloride and the resulting reaction product is thereafter washed and recovered.

Now I have observed that the polymeric fatty material mixture obtained by said zinc chloride and free hydrogen chloride reaction treatment is contaminated with chlorides, in the form of hydrogen chloride, loosely bound up with the fatty acid polymer mixture. These chlorides, in whatever form they may be present, cannot be removed by simple washing of the product. It is desirable, therefore, to remove them from the polymer mixture to obtain a chloride-free product for several important reasons. First, the chlorides present appear to be in some kind of loosely held combination. Hereinafter, I shall use the terms "loosely added" or just "added" to the polymer mixture, to refer to these contaminating chlorides in whatever form they may be present. This form of chloride, and by the term chloride it is to be understood that halides are generally included, is highly undesirable because it decomposes or splits out hydrogen chloride or hydrogen halide upon the application of heat in subsequent processing or refining steps. Hydrogen chloride is, of course, known to be a highly corrosive material so that it is necessary to eliminate it if substantial corrosion of processing equipment is to be avoided. Secondly, depending on the use to which said polymer products are to be put, the presence of chlorides therein may be objectionable. Finally, by removing the chlorides from said polymerized fatty acid materials, a better colored product is obtained, thereby increasing its sale potential and uses.

An object of my invention is the removal of added halides from polymerized fatty acids mixtures.

Another object is the provision of a process, which is economical, for the removal of halides from fatty acid polymerized mixtures.

A further object is to refine a ploymerized fatty acid mixture containing added halides to provide a product of better color and quality. Other objects will be found in the specification of my invention.

I have discovered that if, at the end of the polymerization reaction wherein an unsaturated fatty acid material is heated with a zinc halide or zinc oxide in the presence of a halogen or free hydrogen halide, the reaction product is contacted with zinc there is obtained a chloride-free polymeric mixture possessing desirable physical and chemical characteristics.

As briefly stated above, my invention comprises treating a polymerized fatty acid mixture with zinc and includes the steps of washing the treated product and heat-treating the polymeric mixture with steam to obtain a product substantially completely free of contaminating chlorides. A solvent in about 80% polymerized fatty acid concentration can be used in the zinc treating step, although this does not form the preferred embodiment of my invention. It is desirable, however, to employ a solvent for the washing step in an amount of from about 50 to 60%.

In a preferred embodiment of my invention, after the polymerization reaction of the unsaturated fatty acids with zinc chloride in the presence of an excess of hydrogen chloride, zinc is added to the reaction mixture for the purpose described above, or the reaction mixture is passed through a bed of mossy zinc. In this embodiment, the zinc-treated fatty acid polymeric mixture, is then washed with an aqeous acidic solution, that is, a dilute acid wash, followed by a water wash in order to remove combined zinc and other washable impurities. The dilute acids preferred are hydrochloric, sulfuric or phosphoric.

Whether a solvent for the fatty acids has been used initially or after the reaction or not, I have found that advantageous results can be obtained by heat-treating the product, after removal of the solvent where it is used, at temperatures of from about 250 to 280° C. in the presence of a small amount of steam for a period of about 10 minutes in order to remove any halides not removed by the zinc treatment. When the zinc treatment is used in accordance with my invention, this residual halide(s) amounts to about one-fifth or less of the amount removed when the zinc treatment is omitted.

After the heat treatment of the fatty acid polymeric mixture with steam, the mixture is treated to separate the volatile from the nonvolatile materials present therein. This is best accomplished with a flash still by removing the volatile material continuously at a vapor temperature of 185° to 210° C., with a pot temperature at about 210° to 240° C. with no fractionation, and without steam at 1–2 mm. Steam can be used, however. The nonvolatile polymeric product is removed continuously from the lower part of the still. A batch separation, however, is also practical.

As to the composition of both volatile and nonvolatile products, reference can be made to the foregoing mentioned copending application and to the specific examples presented below. This invention is not concerned with a process for preparing the products per se, but is based on a process for refining, upgrading and in general preparing a quality product or products obtained by the invention disclosed in my copending application.

The amount of zinc added to a fatty acid polymeric mixture can vary considerably. However, amounts in the order of from 0.2% to 10% by weight give highly desirable results. Also, the polymeric fatty acid mixture can be passed through a column containing a bed of mossy zinc for a contact time of the mixture with the zinc of the order of about 5 to 120 minutes. In general I prefer to use 30 to 60 minutes. Excess zinc is present and only about 0.2 to 0.5% is consumed, the balance being recovered for reuse.

Solvents that are applicable herein, and there are many, include xylene, toluene, mineral spirits, VPM Naphtha and the like. The amount of solvent necessary is not critical, although I have found that concentrations of fatty acid polymeric mixtures of about 40 to 50 percent are well adapted herein. In general I prefer to add solvent only just prior to washing.

In the examples to follow, tall oil fatty acids analyzing typically as follows, were used: Gardner color 5–6+; acid number, 194; saponification number, 196; iodine number, 130; rosin acids, 1%, unsaponifiables, 2–2.4%; linoleic acid about 48%; oleic acid about 50%; saturated acid about 2%. Commercial tall oil fatty acids representative of the foregoing are sold by Arizona Chemical Co. as "FA–2" and by the Union Bag-Camp Corp. as "Unitol ACD."

*Example 1*

Five hundred grams of FA–2 was heated at 155° to 160° C. for 2.5 hours with 0.25% zinc chloride and 2.5% hydrogen chloride. Twelve grams of zinc dust was then added and stirring continued for 1 hour. The fatty acids were then decanted from the unreacted portion of the dust, diluted to about 45% concentration in toluene, washed with 6 grams of sulfuric acid in about 400 ml. of water and then finally washed twice with hot water. After removing the solvent to about 155° C. with steam, the product was heat-treated with gentle steaming at 275–285° C. for 10 minutes. The heat-treated acids were then distilled at 1–2 mm. The yield of non-volatile residue was 44%; acid number, 133; Gardner viscosity 25° C. Z–2—Z–3: Gardner color, 11–12.

*Example 2*

Five hundred grams of FA–2 was heated at 155° C. for 4 hours with 0.5% zinc chloride and 1.5% hydrogen chloride and then processed exactly as described in Example 1 including the zinc treatment. The yield of nonvolatile residue was 46%, the acid number 134, the viscosity Z–2—Z–3 and the color, 10–11 Gardner.

*Example 3*

Five hundred grams of FA–2 was dissolved in xylene (80% FA–2) and 3.0 grams of zinc oxide and 6 grams hydrogen chloride added at 148° to 150° C. The catalyst was equivalent to 1% zinc chloride plus 0.6% free hydrogen chloride based on the FA–2. The solution was heated at 148° to 150° C. for 4 hours and then thirty minutes in the presence of 10 grams of zinc dust with stirring. After diluting to 45% fatty acid product concentration, the decanted solution was washed with dilute hydrochloric acid and, finally, with water. Further processing was as described in Example 1. Only traces of hydrogen chloride was found in the condensed water from the steam used to remove the solvent to a temperature of 200° C. while 0.87 g. was removed between 200° and 280° C. The Beilstein test for chlorine was negative for both the volatile and residual acids. The nonvolatile residue amounted to 38.2%; acid number, 116; Gardner viscosity 25° C., X; Gardner color, 10–11. The volatile acids obtained in the distillation at 1–2 mm. had a color of 2 to 3; acid number 194; viscosity, A.

*Example 4*

Five hundred grams of FA–2 was heated at 160° C. for 3 hours with 1.5% zinc chloride and 1.2% hydrogen chloride. No metallic zinc treatment was used. Otherwise, further processing was as described in Example 1.

The voltile acids were obtained in 53.2% yield and had a color of 4–5 versus a color of 1 where the zinc treatment was used.

The nonvolatile residue (46.8%) had a color of 13 versus 9–11 where zinc dust treatment was used. The acid number was 151, the viscosity Z–6, saponification number 189, unsaponifiables 0.8%.

The water used during the steam-distillation to remove solvent and in the heat-treating step contained 5.13 grams of hydrochloric acid, approximately five times as much as when the zinc dust-treating step was included.

*Example 5*

Five hundred grams of FA–2 was heated at 155° to 165° C. with 1.5% zinc chloride and 3.0% hydrogen chloride for 2.5 hours. Twenty grams of zinc dust was then added and the material was stirred for 1 hour and after decanting away from unreacted zinc dust, the product was then processed as described in Example 1, except dilute hydrochloric acid was used to wash the solution.

The nonvolatile residue was recovered in 50% yield after distilling off monomeric acids. The acid number was 155, saponification number 188, color 12–13, Gardner viscosity at 25° C. Z–6—Z–7.

The larger amount of hydrogen chloride yielded a higher viscosity, darker product than when 1.2% hydrogen chloride was used, but the infrared spectrum of the volatile acids indicated there was some lactone formation not present in observable quantities when smaller amounts (1.2%) hydrogen chloride was used.

*Example 6*

Five hundred grams of FA–2 was heated at 155° C. for 4 hours with 1.5 zinc chloride (generated in situ from an equivalent amount of zinc oxide and chlorine) and 1.2% chlorine. The product was then processed as described in Example 1.

The nonvolatile residue was obtained in 45% yield, the color was 13–14, acid number 148, saponification number 199, viscosity Z–5—Z–6. The color was not as good as when hydrogen chloride was used, although the zinc treating step was carried out in the same way.

The volatile acids were recovered in 54.5% yield and had a color of 2–3.

*Example 7*

Five hundred grams of Unitol ACD was heated at 155° to 160° C. with 1.5% zinc bromide and 2% hydrogen bromide for 2.5 hours and then stirred with zinc dust for 1 hour. The product was processed as described in Example 1. There was obtained 46.8% of nonvolatile acids which had an acid number of 145, a Gardner viscosity of Z–4 and a Gardner color of 9–10.

*Example 8*

In this example 500 grams of Armour's Neofat 122 (soya oil, fatty acids) A.N. 196, color 5, linoleic acid 49%, palmitic 16%, stearic 4%, oleic 29% and linolenic 2%, was heated at 150° to 155° C. for 3 hours with 1.5% zinc chloride and 1.2% hydrogen chloride. The reaction product was then processed as described in Example 1, including the zinc dust treatment.

The nonvolatile fraction was recovered in 47% yield, the acid number was 159, the color 10 and the viscosity Z–6. This soya-derived oil yielded a nonvolatile fraction similar to that obtained from tall oil fatty acids.

*Example 9*

Five hundred grams of FA–2 was heated at 160° C. for 3 hours with 1.5% zinc chloride and 1.2% hydrogen chloride and then poured into 3000 ml. of naphtha consisting principally of heptane.

A dark precipitate settled out of the solution on cooling to 30° C. which was filtered from the solution.

The solvent was then removed with steam to a pot temperature of 165° C. The product was then heat-treated with gentle steaming at 280° C. for 10 minutes. At this point the color was 9–10 and the acid number 173.

On distilling at 1 to 2 mm., a nonvolatile fraction was obtained in 45.7% yield. The acid number was 153, the color 11, the viscosity Z–5—Z–6 and the ash 0.19%.

The volatile fraction was obtained in 54.3% yield with a color of 2–3.

By using this method of diluting the reaction product with naphtha and removing a probable zinc chloride addition product a fairly light colored product is obtained, but there was 5 grams of hydrogen chloride broken out on heat-treating, whereas, approximately one-fifth of this amount is broken out where the zinc dust treating step is used.

Example 10

One thousand grams of Unitol ACD, 1.5% zinc chloride and 1.2% of hydrogen chloride were heated at 157° to 165° C. for 2.5 hours. The reaction solution was divided into two equal parts. The first part was washed with dilute hydrochloric acid and water and the solvent removed with steam to a pot temperature of 160° C. This recovered product had an acid number of 173, a viscosity of N and a color of 12–13 Gardner.

The second part was treated with zinc dust as described in Example 1 and then processed as described with part 1 above. The acid number of the recovered product was 169, the color was 9–10 and the viscosity 0. The infrared spectra of the two products showed no differences.

Although the examples I have offered above show the treatment of a polymeric fatty acid mixture in a solvent with zinc dust, I can also, as I have stated before, employ a column containing a bed of mossy zinc and pass the mixture through it to obtain the same result.

I am satisfied that the examples offered above demonstrate the unique advantages of the process of my invention. Accordingly, it is to be understood that modifications can be made falling within the scope of my invention and the appended claims.

Having thus described my invention, I claim:

1. A process for treating a polymerized fatty acid mixture, said mixture containing added halogen substances, which consists of treating said mixture was zinc to remove said added halogen substances and recovering therefrom a polymerized fatty acid mixture substantially free from said added halogen substances.

2. A process for refining a mixture of polymerized fatty acids, said mixture being contaminated with added halogen substances, which comprises essentially of treating said mixture with zinc, washing said treated mixture to remove impurities resulting from said treatment and thereafter recovering therefrom a product substantially free from said added halogen substances.

3. A process for refining a mixture of polymerized fatty acids, said mixture being contaminated with added halogen substances, which consists of adding to said mixture a quantity of zinc, sufficient to remove said halogen substances, adding a solvent to said zinc-treated mixture, washing said mixture to remove impurities resulting from said addition of zinc, removing the solvent therefrom and recovering a product substantially free of said added halogen substances.

4. A process according to claim 3 wherein the polymerized fatty acid mixture, after the solvent removal step, is treated with steam to remove residual traces of added halogen substances.

5. In a process for refining a polymerized fatty acid mixture comprising essentially of the reaction product of unsaturated fatty acids heated with a catalyst substance selected from the group consisting of zinc chloride, zinc bromide and zinc oxide in the presence of an excess of a halogen substance selected from the group consisting of chlorine, bromine hydrogen chloride and hydrogen bromide, the improvement which comprises treating said polymerization product with zinc, adding a solvent thereto, washing the zinc-treated solution to remove impurities resulting from said addition of zinc, removing the solvent therefrom, heat-treating the polymerized product with steam and recovering therefrom a final product substantially free of added halogens.

6. The process of claim 5 wherein the polymerized fatty acid mixture is obtained by reaction with zinc chloride in the presence of excess hydrogen chloride and the solvent is added prior to the zinc treating step.

7. The process of claim 5 wherein the zinc-treated solution is heated at a temperature above about 100° C.

8. The process of claim 5 wherein the polymerized product, after the removal of the solvent therefrom, is heat-treated with steam at a temperature of above about 250° C.

9. The process of claim 5 wherein the zinc-treated solution is washed with an aqueous inorganic acid solution.

10. The process of claim 5 wherein the zinc added to the polymerized fatty acid product, is added in amounts sufficient to remove added halogen substances.

11. The process of claim 5 wherein the polymerized fatty acids are passed through a bed of mossy zinc.

12. The process of claim 6 wherein the zinc treated solution is heated at a temperature of above about 100° C.

13. The process of claim 12 wherein the polymerized product, after the removal of the solvent therefrom, is heat-treated with steam at a temperature above about 250° C.

14. In a process for refining a polymerized fatty acid mixture comprising essentially of the reaction product of unsaturated fatty acids heated with a catalyst selected from the group consisting of a zinc chloride and bromide, the improvement which comprises treating said polymerization product with zinc, adding a solvent thereto, washing the zinc-treated solution to remove impurities resulting from said addition of zinc, removing the solvent therefrom, heat-treating the polymerized product with steam and recovering therefrom a final product substantially free of added halogens.

References Cited in the file of this patent

UNITED STATES PATENTS 2,334,850   Traylor _____ Nov. 23, 1943

OTHER REFERENCES

Noury: Chem. Abs., vol. 34, p. 650 (1940).